Oct. 13, 1942.   R. T. COOK ET AL   2,298,784
OPHTHALMIC MOUNTING
Filed June 29, 1938
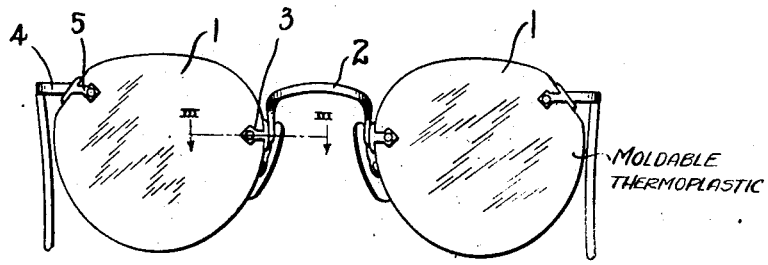
Fig. I
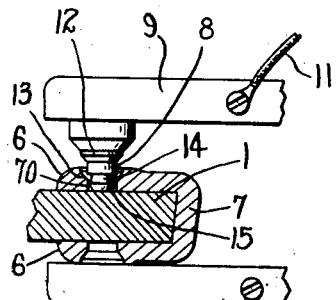
Fig. II
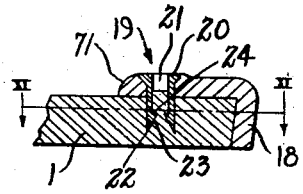
Fig. IV
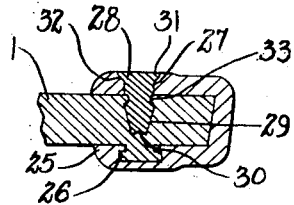
Fig. V
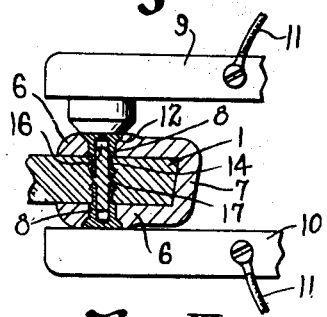
Fig. III
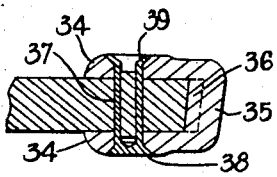
Fig. VI
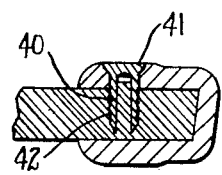
Fig. VII
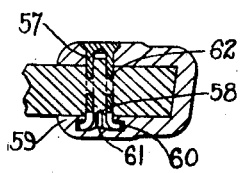
Fig. X
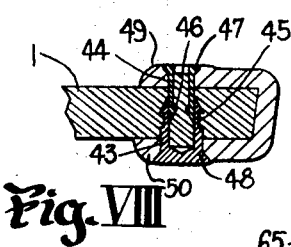
Fig. VIII
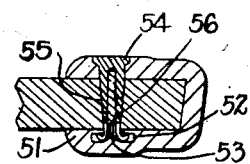
Fig. IX
Fig. XI
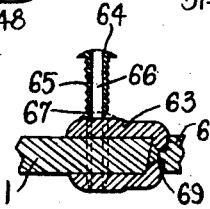
Fig. XII
INVENTOR.
ROLAND T. COOK
WILFRID A. BOHM
BY Harry H. Styll
ATTORNEY.

Patented Oct. 13, 1942

2,298,784

UNITED STATES PATENT OFFICE 2,298,784

OPHTHALMIC MOUNTING

Roland T. Cook and Wilfrid A. Bonin, Southbridge, Mass., assignors to American Optical Company, Southbridge, Mass., a voluntary association of Massachusetts Application June 29, 1938, Serial No. 216,526

5 Claims. (Cl. 88—47)

This invention relates to improvements in ophthalmic mountings and has particular reference to improved means and methods of connecting the lenses to the lens holding means of such mountings.

One of the principal objects of the invention is to provide improved means and methods of connecting the lenses of an ophthalmic mounting to their lens holding means in such a manner as to avoid the preforming of connection openings in the lenses.

Another object is to provide novel means and methods of connecting lens holding means to lenses formed of material having the characteristics of an artificial resin, such as methyl methacrylate, etc.

Another object is to provide a novel method of securing lenses of the above character to their holding means whereby the material of the said lenses aid in retaining the lens holding means in desired position thereon.

Another object is to provide connection means which may be heated and pressed through an opening in lens holding means, when in position on the lens, and into the body of the lens to cause the material of the lens to soften under the action of the heat and flow about the rivet, and, when cool, to harden and secure the rivet in position therein.

Another object is to provide novel connection means for connecting the lens holding means to the lenses, which may be pressed into an opening in a portion of the lens holding means through the body of the lens and into mechanically interlocked relation with another portion of said lens holding means.

Another object is to provide novel means and methods of connecting lenses of an ophthalmic mounting to their lens holding means whereby a portion of the body of a lens may be displaced into connected relation with a portion of the lens holding means and simultaneously have a connection member embedded therein.

Other objects and advantages of the invention will become apparent from the following description taken in connection with the accomapnying drawing, and it will be apparent that many changes may be made in the arrangement of parts, details of construction and methods shown and described without departing from the spirit of the invention as expressed in the accompanying claims. We, therefore, do not wish to be limited to the exact details of construction, arrangement of parts and methods shown and described, as the preferred forms only have been given by way of illustration.

Referring to the drawing:

Fig. I is a front elevation of an opthalmic mounting embodying the invention;

Fig. II is an enlarged fragmentary sectional view illustrating one of the steps of the method of connecting the lens holding means to the lens;

Fig. III is a view generally similar to Fig. II, showing the connecting means for securing the lens holding means to the lenses in final assembled position, and illustrating an enlarged sectional view through a lens holding means and lens, taken as on line III—III of Fig. I and looking in the direction illustrated by the arrows;

Figs. IV to X, inclusive, are sectional views, similar to Fig. III, illustrating different modifications of the invention;

Fig. XI is a fragmentary view taken as on line XI—XI of Fig. IV; and

Fig. XII is a view generally similar to Figs. IV to X, inclusive, illustrating a further modification.

Ophthalmic lenses, in the past, have usually been formed of glass having a fragile nature. It has been usual in connecting such lenses to the lens holding means or lens straps of an opthalmic mounting, to form connection openings in the lenses in aligned relation with suitable connection openings formed in the lens holding means or straps. Such openings were to receive separate connecting means by which the lenses were secured to said holding means or straps.

Much difficulty has been encountered in properly fitting and securing such prior art lens straps to the lenses, particularly in instances where it was desired to have the lens straps connected in relatively rigid relation with the lenses. This difficulty was due primarily to the inability of the connection openings to be formed in proper relation with respect to the edges of the lenses. If said connection openings were formed too close to the edges of the lenses, the lens holding means or lens straps would fit loosely thereon. If, on the other hand, the openings were spaced inwardly of the edges a greater amount than necessary, the openings in the strap and lens could not be aligned and, therefore, could not be connected. Great care, therefore, had to be taken to be sure the openings were in proper alignment when the parts were in desired fitted relation with each other.

Such connection openings were formed in the lenses by a separate drilling operation and, because of the fact that most prior art lenses were formed of glass having an exceptionally fragile nature, such drillings were exceptionally difficult and painstaking operations.

Disalignment of the connection openings also caused a strain to be set up in the lenses when the connection means were inserted in the connection openings, and such strain, in many instances in the past, caused the lenses to break and become impractical for use.

It, therefore, is one of the primary objects of this invention to overcome the above difficulties by providing lenses formed of resinous material having the characteristics of methyl methacrylate and method of assembling and connecting such lenses with the lens holding means of the mounting whereby said lens holding means may be connected in positive rigid relation with the lenses without the necessity of first forming and aligning connection openings, and has particular reference to the novel method of connecting the lens holding means to the lenses whereby the material of the lens aids in holding the connecting means used in securing the lens holding means or lens straps to the lenses.

Referring more particularly to the drawing, wherein like reference characters refer to like parts throughout the several views:

The ophthalmic mounting embodying the invention comprises a pair of lenses having a bridge member 2 connected thereto by suitable lens straps or lens holding means 3. Suitable temple supports 4 are connected to the lenses by lens straps or lens holding means 5, having characteristics similar to lens straps or lens holding means 3.

The lens straps 3 or 5, as the case may be, as shown in Figs. II and III, may be provided with one or two ears 6, shaped to overlie the side surfaces of the lens 1 and have a portion 7 shaped to overlie the edge of the lens. The portions 6 are provided with openings 70 through which suitable connecting means 8 may be extended, as shown in Fig. II. A pair of pliers or other means having spaced jaws 9 and 10 may be used for pressing the connecting means 8 into the body of the lens. It is to be particularly noted that the lens 1, prior to the insertion of the connection means 8 therein, is not perforated. The jaws 9 and 10, prior to exerting pressure on the means 8, may be connected as though the lead wires 11 to an electrical heating unit not shown, so that said jaws may be heated a controlled amount and thereby cause the connecting means to be heated prior to exerting pressure thereon. The intensity of the heat is carefully controlled so that it will be just sufficient to enable the connecting means 8 to move fairly freely into the main body portion of the lens 1 when pressure is exerted on the portions 9 and 10; and such as to cause the material of the lens to flow slightly about the connecting means and assume a substantially intimate relation with the outer contour surface of the connecting means when the heat is shut off and the material of the lens is allowed to cool. In this instance, the connecting means 8 is provided with an enlarged head 12 shaped to fit within a similar shaped countersink 13 formed in alignment with the opening 70 in the strap ear 6.

The connecting means 8 is provided with a body portion having a circumferential groove 14 therein, in which the material of the lens 1 is adapted to flow when softened under the action of the heat. The said connecting means 8 also has a tapered end 15 and a hollow bore 16 forming a knife-like edge 17 which is adapted to cleave its way into the material of the lens when pressure is exerted on said connecting means.

Similar connecting means 8 is placed in the opening in the opposed strap ear 6, as illustrated in Fig. III. The length of said connecting means 8 is controlled according to the thickness of the lens 1, and is such that the said connecting means may be completely embedded in the body portion of the lens with the head portion 12 fitting within the countersink 13. It is to be understood that the lens holding means or lens strap 7 is located in desired position on the lens and is held in desired fitted position with the lens during the process of embedding the connecting means 8 therein. This arrangement provides means and method for insuring a relatively rigid connection of the lens strap or lens holding means with the lens.

Fig. IV illustrates a modified form of lens strap or lens holding means having only a single ear 71 overlying a side surface of the lens and having a portion 18 overlying the edge of the lens. In this instance a single connecting member 19, having an enlarged head 20 and hollow bore 21, is used. The connecting member, in this instance, has a knife-like edge 22 and inwardly tapered cone-like inner walls 23 terminated in a shoulder 24 adapted to assume positive interlocked relation with the lens when embedded therein when under pressure such as described above.

Fig. V illustrates a further modification wherein one of the lens strap ears 25 has a shouldered recess 26 therein, and the other of the said ears has an opening 27 in which a solid pin-like member 28 is positioned. The pin-like member 28 has a tapered projecting portion 29 and a slightly cupped end 30 which, when the pin-like member 28 is pressed into the body 1, is adapted to force the material of the lens into the shoulder 26. It is to be understood that the pin-like member is heated prior to its being forced into the body of the lens 1 and thereby causes the material of the lens to soften so that it may be easily displaced. The pin-like member 28 has an enlarged end 31 adapted to engage within a countersink 32 in the opening 27 and has a circumferential groove 33 adapted to interlock with the material of the lens when embedded therein. The pin-like member 28 is heated and forced inwardly of the lens through the use of heated jaw members, such as shown at 9 and 10 in Fig. II.

Fig. VI illustrates a further modification wherein the lens strap or lens holding means is provided with spaced perforated ears 34 and with a portion 35 overlying the edge of the lens and having a key 36 adapted to fit within a slot formed in the edge of the lens. The connecting means, in this instance, is in the form of a tubular member 37, having an enlarged closed end 38. The tubular member is heated and pressed through the opening in one of said ears, through the lens, and into the opening in the opposed ear, an amount sufficient to engage the enlarged end 38 with its adjacent strap ear. The opposite end of the tubular member 37 is thereafter deflected outwardly, as illustrated at 39, by a suitable tool to cause the said end 39 to be forced into binding relation with the other of said strap ears. It is to be understood that the key 36 and slot are in proper fitted relation with each other prior to the insertion of the connecting means 37.

Fig. VII illustrates a further modification wherein a connecting member 40, having an enlarged head 41 adjacent one end thereof, is used. In this instance the outer surface of the projecting portion of the connecting means is provided with a corrugated or roughened surface 42. The connecting means is otherwise generally similar to the connecting means illustrated in Fig. IV except that its enlarged end 41 is closed.

Fig. VIII illustrates a further modification wherein a pair of connecting members 43 and 44 of different diameters are used. The connecting members are adapted to be inserted from opposite sides of the strap and forced into telescoped relation with each other. The member 43 is provided with a circumferential groove 45 in the outer surface thereof adapted to assume an interlocked relation with the lens when forced therein. The member 44 is provided with an internal shouldered ridge 46 which, when forced into telescoped relation with the member 43, is adapted to interlock with the material of the lens which enters the hollow bore of the member 43 when the said member is forced into the lens. Both of said connecting members are provided with side walls which taper into a knifelike edge adjacent the ends which are forced into the lens and are provided, adjacent their opposite ends, with enlarged heads 47 and 48 which are adapted to assume a seated relation within suitable counterbores or countersinks in the perforated ears 49 and 50 of the lens strap. This arrangement provides means whereby the strap may be quickly and easily fitted and connected to lenses of varying thicknesses, as the telescoping characteristics of the connecting means will compensate for said thickness variations. The inner surface of the hollow bore of the member 43 may be provided with projections or grooves to interlock with the material of the lens which is forced inwardly thereof when the said member is pressed into the lens.

Fig. IX illustrates a further modification wherein one of the strap ears 51 is provided with a shouldered recess 52 having a slightly raised portion 53 therein. The connecting means, in this instance, is in the form of a hollow rivet or pin having an enlarged head 54 and hollow body portion 55. The outer surface of the body portion 55 is tapered toward its end opposite the head 54 and the said end is provided with a plurality of slots 56 which, when the body portion is pressed through the lens, and the end of the body portion engages the raised portion 53, inwardly of the shouldered recess 52, allows the side walls of the slotted end to be deflected outwardly by the raised portion 53 and interlock with the shoulders of the recess 52. In this instance, only one of the strap ears is formed with a perforation so that the binding action imparted by the connecting means 55 is brought about through the engagement of the enlarged head 54 with one of the strap ears and the anchoring of the opposed end of said connecting means inwardly of the shouldered recess 52 by causing the deflection of the slotted end of said connecting means inwardly of said shouldered recess. The width of the recess is such that, if a relatively thin lens is being connected to the lens strap, more of the slotted end of the connected means may be displaced within the recess and thereby compensate for the thinness of the lens. If the lens is relatively thick a less amount of the slotted end of the lens will be deflected inwardly of the recess. A single connecting member 55 may, therefore, be provided for use in connecting the lens straps to lenses of varying thickness.

Fig. X illustrates a further modification which utilizes connecting means 57 generally similar to the connecting means 55. That is, the said connecting means 57 has a plurality of slots 58 therein, simulating the slots 56 in the member 55, and the strap ear 59 is provided with a shouldered recess 60 having a raised portion 61 therein simulating the recess 52 and raised portion 53, the construction being shown in Fig. IX. The connecting means 57, however, is provided with a plurality of openings 62 in the main hollow body portion thereof. These openings, during the process of assembling the strap and lens under the action of heat, allow the material displaced inwardly of the hollow bore of the connecting member 57 to flow outwardly through the plurality of openings 62 and integrally unite with the material of the lens surrounding said hollow portion. It is to be understood that this action takes place substantially instantaneously when the connecting means is forced into connected relation with the strap and lens.

The intensity of the heat of the connecting means, prior to its being forced inwardly of the lens, is carefully controlled so that the material of the lens engaged and heated by said rivet will flow sufficiently freely to integrally join through said openings 62. The composition, from which the lenses are formed, has characteristics which permit it to flow quite freely when subjected to heat of comparatively low intensity, as compared with lenses formed of glass, and hardened quite quickly on cooling.

Fig. XI illustrates a cross sectional shape of the connecting means 19, shown in Fig. IV, and likewise illustrates the general shape of the remaining connecting means embodying the invention.

It is to be understood, however, that the connecting means do not have to be circular in cross sectional shape, as it is apparent that they may be formed rectangular, oval or any other shape desired. In instances wherein the connecting members telescope with each other, as illustrated in Fig. VIII, the cross sectional shapes of said connecting members will obviously have to be similar.

The composition of the lenses described herein is of a resinous nature having the characteristics of methyl methacrylate. There are several of these compositions in commercial use today. These are put out under various names such as Plexiglas, Lucite, Metastyrol, etc. There are also certain commercial phenolic condensation products that may be used, such as Bakelite, Catalin, Marblette and Fiberlon. Materials having the characteristics of methyl methacrylate are clear and transparent and are exceptionally resistant to acids, corrosion, weathering, etc. Such materials are exceptionally light in weight and have a relatively tough, non-frangible nature. Another feature of great importance is that said materials are relatively non-inflammable. It is, therefore, possible to use heated type connecting means such as described above for uniting the lens straps or lens holding means with such lenses without the danger of igniting the lenses.

It is to be borne in mind that the temperature of the heat used is only such as to permit the connecting means to be easily forced into the composition of the lens and is only sufficient to cause the composition of the lens in immediate engagement with the connecting means to materially soften and flow. This is important when it is desired to form a rigid and positive connection between the lens strap and the lens.

It is to be understood that any of the strap and lens arrangements described herein may be provided with a peripheral tongue and groove such as shown in Fig. VI.

The process of connecting the lens straps or lens holding means with the lenses is substantially as follows:

The lens 1 is first shaped to the desired contour shape. The lens strap, or lens holding means, is then fitted, as by bending the lens face engaging ears, etc. to fit snugly with said lens. The strap is positioned and held in desired fitted relation with the lens. The connecting means which is to be used in connecting the strap to the lens is placed in the opening in one of the lens strap ears and held in position by means of the clamp jaws of a pair of pliers or other suitable means. The jaws are then heated to a temperature which, under pressure exerted on said jaws, will enable the connecting means to move fairly freely inwardly of the body portion of the lens. The parts are held in this relation and allowed to cool and set. Upon hardening, the material of the lens grips the connecting means and rigidly holds the parts in assembled relation with each other.

It is to be understood that the heat is only sufficient to cause the material of the lens to flow to the outer or inner contour shape of the connecting means so that, when allowed to cool, the connecting means and the material of the lens adjacent the connecting means will be relatively intimately fitted with each other.

The connecting means are preferably formed of a metal or material which may be heated more readily than the metal or material of the lens strap or lens holding means so that when the heated jaws are moved into engagement with said lens strap and said connecting means, the said connecting means will heat more quickly. It is also to be understood that the heating device may be so arranged to direct the major portion of its heating to said connecting means.

The heating unit may be of the electrical type commonly known in the art, in which instance the rivets or connecting means could be formed of a metal such as Inconel, Nichrome, Chromel, or the like, having a high resistance and the lens straps or lens holding means formed of a metal or alloy, such as copper alloy or the like having a low resistance so that the heating will take place in the rivet or connecting means rather than in the lens strap. This step of heating is carefully controlled so that it will not in any way injure or spoil the connection. If an electrical type heating unit is used, wherein the heat is generated very quickly, the said device is snapped on and quickly snapped off.

Fig. XII illustrates a further modification wherein the lens strap 63 is formed of a composition having characteristics similar to the composition of the lens 1. In this instance, neither the lens strap 63 or lens 1 are provided with connection openings. The lens strap 63 is positioned in desired relation with the lens and a heated rivet or the like 64, having suitable interlocking means 65 thereon, is forced through one of the strap ears, and into and through the lens 1. It is to be understood that any of the connecting means shown herein may be used in joining the lens strap 63 to the lens, or that any other connecting means having similar characteristics may be used. The said connecting means may extend through one of the strap ears, through the lens, and into the other strap ear; or the said strap may have one ear, in which instance, the said strap may extend through the ear and into the body of the lens. This is accomplished by controlling the length of the connecting means. It is to be understood that the lens and lens strap 63 may be formed the same or different colors.

The rivet 64 is provided with a hollow bore 66 and a knife-like edge 67 so that the said rivet has a combined punch and riveting function. It is apparent that the hollow bore and knife-like edge 67, when pressed into the material under the action of the heat, will cut a plug-like piece out of the immediately engaged ear of the strap 63 and lens 1 during its inward movement through said strap ear and lens; and simultaneously force the irregular protrusions of the sides 65 into locked relation with said strap ear and lens.

It is also apparent that connecting means, such as shown in Fig. VI, might be used instead of the rivet 64, in which instance the said connecting means would be in the form of a hollow tubular member having an enlarged head at one end, and a knife-like edge adjacent its opposite end. The connecting means or rivet would be heated, pressed through the strap ears and lens and the opposed knife-like edge deflected outwardly in a manner simulating the deflections 39.

It is also apparent that a pair of connecting members such as are illustrated in Fig. III might also be used.

Should the material of the lens strap and lens, forced inwardly of the hollow bore 66, of the connecting means 64, protrude from said connecting means, after the parts have been united, said material may be extracted from the connecting means or cut off flush with the head of the connecting means.

It is to be understood that the lens straps 63 may be connected to the bridge, temple supports, or other parts of the ophthalmic mounting as indicated at 68, Fig. XII, which are to be assembled with the lenses, as by a headed pin connection 69, or by any other suitable means.

From the foregoing description it will be seen that simple, efficient and economical means and methods have been provided for quickly and easily attaching the lens holding means of composition type lenses to said lenses, particularly novel means and methods whereby the connecting means may be forced into rigid connected relation with the lens and lens holding means without first forming a connection opening in the lens.

Having described our invention, we claim:

1. An ophthalmic lens of transparent moldable plastic material normally having no preformed connection opening therein and lens holding means having a pair of spaced ears, one on each side of the lens, one of said ears having an opening therethrough and the other of said ears having an undercut recess in its lens engaging face and having an opposed imperforate outer surface and a connecting member having an enlarged head adjacent one end thereof and a main tubular like body portion forced through the opening in one of said ears, through the material of the lens and into engagement with the undercut recessed portion of the opposed ear with its enlarged head engaging the ear having the opening therein and with the opposed end of the tubular body portion having portions flared outwardly beneath the undercut part of the recess of the adjacent ear so as to mechanically interlock therewith and with certain of said plastic material being present within the tubular member after said connection member is in anchored relation with the ears of the lens holding means.

2. An ophthalmic lens of transparent moldable plastic material normally having no preformed connection opening therein and lens holding means having a pair of spaced ears, one on each side of the lens, one of said ears having an opening therethrough and the other of said ears having an undercut recess in its lens engaging face and having an opposed imperforate outer surface and a connecting member having a main tubular like body portion with an enlarged head adjacent one end thereof and a plurality of spaced slots in its opposite end forced through the opening in one of said ears, through the material of the lens and into engagement with the undercut recessed portion of the opposed ear with its enlarged head engaging the ear having the opening therein and with its slotted end having portions flared outwardly beneath the undercut part of the recess of the adjacent ear so as to mechanically interlock therewith and with certain of said plastic material being present within the tubular member after said connection member is in anchored relation with the ears of the lens holding means.

3. An ophthalmic lens of transparent moldable plastic material normally having no preformed connection opening therein and lens holding means having a pair of spaced ears, one on each side of the lens, one of said ears having an opening therethrough and the other of said ears having an undercut recess in its lens engaging face with a slightly raised portion in the base of said recess and having an opposed imperforate outer surface and a connecting member having an enlarged head adjacent one end thereof and a main tubular like body portion forced through the opening in one of said ears, through the material of the lens and into engagement with the slightly raised portion in the base of the undercut recessed portion of the opposed ear with its enlarged head engaging the ear having the opening therein and with the opposed end of the tubular body portion having portions flared outwardly by said slightly raised portion and beneath the undercut part of the recess of the adjacent ear so as to mechanically interlock therewith and with certain of said plastic material being present within the tubular member after said connection member is in anchored relation with the ears of the lens holding means.

4. In the method of assembling the parts of an ophthalmic mounting, the steps comprising forming an ophthalmic lens of transparent moldable plastic material with continuous imperforate surfaces, placing on said lens lens holding means having spaced ears for engaging opposite sides of the lens, one of said ears having an opening therethrough and the other having an undercut recess in its lens engaging face and having an outer imperforate surface, heating and pressing connecting means having an enlarged head adjacent one end thereof and a main tubular like body portion through the opening in one of the said ears, through the material of the lens and into engagement with the undercut recessed portion in the other of said ears to force the enlarged head of said connecting means into engagement with the ear having the opening therein and simultaneously cause the opposed end of the tubular body portion to flare outwardly beneath the undercut part of the recess so as to mechanically interlock therewith and simultaneously causing the plastic material in the vicinity at which the connecting means is forced through the lens to be displaced internally of the tubular portion.

5. In the method of assembling the parts of an ophthalmic mounting, the steps comprising forming an ophthalmic lens of transparent moldable plastic material with continuous imperforate surfaces, placing on said lens lens holding means having spaced ears which engage the opposite sides of the lens, one of said ears having an opening therethrough and the other having an undercut recess in its lens engaging face with the base of said recess having a raised portion thereon and having an outer imperforate surface, heating and pressing connecting means having an enlarged head adjacent one end thereof and a main tubular like portion with spaced slots adjacent the end thereof opposite the enlarged head through the opening in one of said strap ears, through the material of the lens and into engagement with the undercut recessed portion and with the raised portion in the base of said recess to force the enlarged head of said connecting means into engagement with the ear having the opening therein and to simultaneously cause the slotted end of the tubular body portion to engage with the raised portion in the recess to flare outwardly beneath the undercut part of the recess so as to mechanically interlock therewith and simultaneously causing the plastic material in the vicinity at which the connecting means is forced through the lens to be displaced internally of the tubular portion.

ROLAND T. COOK.
WILFRID A. BONIN.